(12) United States Patent
Anwander

(10) Patent No.: US 6,812,609 B2
(45) Date of Patent: Nov. 2, 2004

(54) ELECTRIC MACHINE HAVING ELECTRIC COILS AND PERMANENT MAGNETS

(76) Inventor: Werner Anwander, Birkenweg-2, D-87466, Oy-Mittelberg (DE)

( * ) Notice: Subject to any disclaimer, the term of this patent is extended or adjusted under 35 U.S.C. 154(b) by 0 days.

(21) Appl. No.: 10/691,696

(22) Filed: Oct. 23, 2003

(65) Prior Publication Data
US 2004/0119356 A1 Jun. 24, 2004

Related U.S. Application Data

(63) Continuation-in-part of application No. 09/830,020, filed on Jul. 19, 2001, now abandoned.

(30) Foreign Application Priority Data

Oct. 21, 1998 (DE) .......................................... 198 48 503
Oct. 19, 1999 (EP) .................................. PCT/EP99/07919

(51) Int. Cl.$^7$ ............................................... H02K 21/12
(52) U.S. Cl. ............................. 310/156.55; 310/156.18
(58) Field of Search ...................... 310/156.55, 156.37, 310/156.01, 156.18, 268

(56) References Cited

U.S. PATENT DOCUMENTS

| | | | |
|---|---|---|---|
| 3,903,863 A | * | 9/1975 | Katsumata ............... 123/149 D |
| 4,307,443 A | | 12/1981 | Rettew, Jr. |
| 4,330,727 A | | 5/1982 | Oudet |
| 4,334,160 A | | 6/1982 | McCarty |
| 4,477,745 A | | 10/1984 | Lux |
| 4,629,948 A | | 12/1986 | Tassinario |
| 5,240,003 A | | 8/1993 | Lancee et al. |
| 5,289,066 A | | 2/1994 | Clark |
| 5,309,677 A | | 5/1994 | Kunert et al. |
| 5,315,159 A | | 5/1994 | Gribnau |
| 5,460,503 A | | 10/1995 | Kitajima et al. |
| 5,798,591 A | | 8/1998 | Lillington et al. |
| 6,208,055 B1 | * | 3/2001 | Takahashi ............... 310/156.01 |
| 6,232,696 B1 | * | 5/2001 | Kim et al. ............. 310/156.37 |
| 6,424,072 B1 | * | 7/2002 | Armiroli et al. ............. 310/263 |

FOREIGN PATENT DOCUMENTS

| | | | |
|---|---|---|---|
| DE | 3933790 A1 | 4/1991 | |
| DE | 29716116 U1 | * 11/1997 | ............ H02K/3/04 |
| EP | 0 422 539 | 4/1991 | |
| EP | 0 569 594 | 11/1993 | |
| EP | 0751605 A2 | 1/1997 | |
| WO | WO 95 03646 | 2/1996 | |
| WO | WO 96 38902 | 12/1996 | |
| WO | WO 9816001 A1 | * 4/1998 | .......... H02K/44/04 |

* cited by examiner

Primary Examiner—Joseph Waks
(74) Attorney, Agent, or Firm—Collard & Roe, P.C.

(57) ABSTRACT

An electric machine with a rotor and a stator, in which electric coils and permanent magnets are disposed. These coils and magnets influence each other when the rotor revolves. The magnets are cylindrical and are disposed tangentially on a circumference of the rotor. The coils do not have an iron core and at least one section of the coils extends transversely across the circumference of the rotor. The coils are fitted in the stator individually and are bent so that they extend on both axial sides of the rotor and surround the magnets located in the rotor.

16 Claims, 17 Drawing Sheets

| Power in kW | Electrical efficiency in %, 120°C | Electrical efficiency in %, -120°C |
|---|---|---|
| 152 | 91,89 | 97,35 |
| 167 | 92,62 | 97,59 |
| 182 | 93,24 | 97,79 |
| 197 | 93,76 | 97,96 |
| 213 | 94,20 | 98,11 |
| 228 | 94,59 | 98,23 |
| 243 | 94,93 | 98,34 |
| 258 | 95,23 | 98,44 |
| 273 | 95,49 | 98,53 |
| 288 | 95,73 | 98,61 |
| 304 | 95,94 | 98,68 |
| 319 | 96,14 | 98,74 |
| 334 | 96,31 | 98,8 |
| 349 | 96,47 | 98,85 |
| 364 | 96,62 | 98,9 |
| 379 | 96,75 | 98,94 |
| 395 | 96,88 | 98,98 |
| 410 | 97,00 | 99,02 |
| 425 | 97,10 | 99,05 |
| 440 | 97,20 | 99,09 |
| 455 | 97,30 | 99,12 |

ELECTRIC MACHINE HAVING ELECTRIC COILS AND PERMANENT MAGNETS

CROSS REFERENCE TO RELATED APPLICATIONS

This Application is a Continuation in Part Application of U.S. patent application Ser. No. 09/830,020 filed on Jul. 19, 2001 now abandoned incorporated herein by reference which is based upon German Patent Application No. 198 48 503.4 filed on Oct. 21, 1998. Applicant also claims priority under 35 U.S.C. §365 of PCT/EP99/07919 filed Oct. 19, 1999. The international application under PCT article 21(2) was not published in English.

BACKGROUND OF THE INVENTION

1. Field of the Invention

The invention relates to an electric machine with a rotor and a stator in which electric coils and permanent magnets are located. The electric coils and the permanent magnets influence each other when the rotor revolves. The rotor contains the magnets and the stator contains the coils. The coils do not have an iron core and at least one section of the coils extends transversely across the circumference of the rotor.

2. Description of the Prior Art

A machine of this kind has been disclosed in EP-B-0 422 539. The purpose of the invention is to improve this machine.

SUMMARY OF THE INVENTION

In the solution to this problem proposed by the invention, the coils are fitted in the stator individually and then bent in such a way that they extend on both sides of the rotor and enclose the magnets located in the rotor to a large extent.

The fact that the magnets are enclosed by the individual coils leads to the achievement of a very high degree of efficiency, while both production and maintenance are simplified considerably by the provision of individual coils.

In accordance with an advantageous development of the invention, it is provided that the magnets are cylindrical and are located at least approximately tangentially on the circumference of the rotor. This configuration makes it simple to adjust the magnets and the coils.

In another advantageous development of the invention, the number of permanent magnets is equal to twice the number of coils. This configuration results in a sinusoidal shaped progression of the voltage and current curves.

In another advantageous development of the invention, the permanent magnets are attached to the rotor via support elements. This has the effect that the magnets can be easily replaced if this is required.

It is also very advantageous if in accordance with a further development of the invention the coils have a Ω-shaped cross-section and the magnets are immediately next to the inside of the coils. A particularly high degree of machine efficiency is reached as a result.

In another advantageous development of the invention, the support elements of the magnets are attached to the rotor in such a way that they can be replaced. This makes it particularly easy to remove the magnets from the machine and to fit them back on it again.

In another advantageous development of the invention, the coils are movable along the circumference of the stator so that the coils can be pushed together in order to clear a larger opening to the rotor for inserting the permanent magnets or for other service work.

It has also proved to be particularly advantageous if an interlocking facility is provided between the magnets and/or their support elements and the rotor, preferably in the radial direction. A secure connection is established between the magnet and/or support element and the rotor as a result. During operation of the machine, significant centrifugal forces arise as a result of its relatively large radius. The interlocking facility effectively compensates for these high centrifugal forces and prevent the permanent magnets form coming loose from the rotor.

It is also very advantageous if the magnets and/or their support elements are attached to the rotor in an axial direction. This guarantees that the magnets are simple to remove from the rotor.

It is also very advantageous if in accordance with a further development of the invention the connections for the coil are located so that they are accessible individually on the stator during assembly, operation and for service purposes. This makes it simple to check every individual coil if a fault occurs.

It has proved to be very advantageous if in accordance with a further development of the invention the magnets located behind each other have different polarity in each case. The machine achieves high power yield as a result.

It is also particularly favorable if in accordance with a further development of the invention a pole reversal device is provided in the supply line to the coils. As a result of this, the electric machine can on the one hand be operated with direct current voltage before the pole reversal device and with alternating current voltage after the pole reversal device when it is used as a motor, while alternating current voltage can on the other hand be tapped before the pole reversal device and direct current voltage can be tapped after the pole reversal device when the electric machine is used as a generator.

It has proved to be very favorable if in accordance with a further development of the invention the coil is annular and the profiles of the rotor and coil are adapted to each other.

A further advantageous development of the invention is characterized by the fact that several rotors and coil configurations are located behind each other in the axial direction of the machine.

It is also very favorable if in accordance with a further development of the invention at least two machines preferably in the form of motors with different diameters are located behind each other on a mutual machine shaft. The different diameters mean that the motors have different torque, which can be very advantageous in particular when the machine starts up.

It has also proved to be extremely advantageous if the coils are formed from several coils that are only one wire thick in each case. Easier and more precise shaping of the coils is possible as a result. It is very advantageous in this context if the connections for the individual coils are wired individually and are in particular designed so that they can be connected in series ands/or in parallel. It has also proved to be very advantageous if the individual coil layers are in particular glued together with an adhesive that conducts heat effectively. This construction guarantees optimum coil design and good heat dissipation.

In a further advantageous development of the invention, a coil layer is applied for example to a blank and the connectors for the coil are passed to the outside of the coil.

The coil layer can be fixed in place by means of glue. A commercially available glue that conducts heat well can be used as the adhesive to fix the coil layer or layers in place Additional layers may be applied to the first layer in the same manner and the connectors for the additional layers are passed to the outside. The connectors of the coil layers are passed to a terminal which is provided in the vicinity of the coil. This terminal allows the coil layers to be individually switched in series or in parallel with one another.

In a further advantageous development of the invention, incoming lines to the individual coils and/or coil layers are passed to the outside in such a manner that a terminal into which the incoming lines lead can be provided at the stator or in the vicinity of the stator. Switches may be provided at or in the vicinity of the stator which allow the coils to be switched in series or in parallel. The switching between serial and parallel configurations of the coils can also take place automatically during operation of the machine, for example as a function of coil voltage or rotor rotation speed.

In a further advantageous development of the invention, a close coil gap is provided which results in a smooth voltage sine curve without any significant harmonics when the machine is used as a generator. Conventional generators produce voltage curves with harmonics.

In a further advantageous development of the invention, all of the coils are active a the same time resulting in high output density when the machine is used as a generator or high torque if the machine is used as a motor.

In a further advantageous development of the invention, shielding is provided on the outside of the stator that in particular provides magnetic shielding. It is very advantageous in this context if the shielding is made from wire, particularly a plurality of soft iron wires. It is also very advantageous in this context if the shielding wires are located in concentric circles around the shaft of the machine. It is also proved to be advantageous if the shielding is made from sheet metal, particularly soft iron sheet metal. Shielding the stator against magnetic and electric fields that act outwards reduces the effect on the machines in the surrounding area considerably.

In accordance with another development of the invention, it is very advantageous if a cable support is provided on the circumference of the rotor-stator assembly. Tidy and simple cable guidance between the coils in and out of the machine is guaranteed in this way.

In another very advantageous development of the invention, a housing is provided that enclose the entire rotor-stator assembly. This on the one hand provides protection against contact, while it on the other hand effectively keeps dirt, etc. away from the electric machine. It is advantageous in this context if the housing has at least one air inlet opening in the immediate vicinity of the machine shaft. It is also very advantageous in this context if the housing has at least one air outlet opening at least close to the point where the circumference is largest. The air sucked in though the air inlet opening is accelerated towards where the rotor circumference is largest by the rotary movement of the rotor and leaves the housing via the air outlet opening. The machine is cooled effectively as a result. Optimum air flow over and around the coils is guaranteed as a result.

In a further advantageous development of the invention, the air outlet is connected to the air inlet via a heat exchanger provided between them. This is an effective way to remove the waste heat of the machine and possibly to use it for another purpose. It has proved to be very advantageous in this context if the heat exchanger transfers the heat of the machine to a gaseous or liquid medium. It is also very advantageous if the heat exchanger transfers the machine heat to a solid medium and in particular if the heat exchanger is designed to be a geothermal heat exchanger.

It is extremely advantageous if in accordance with a further development of the invention a particle filter is provided on the air inlet. Particles that are harmful to the machine are kept away form the inside of the housing as a result. It has proven advantageous in this context if the particle filter has at least one fine metallic screen. This guarantees that the fine screen can be cleaned and reused even when it has become very dirty.

It is also very advantageous if a magnet, particularly a permanent magnet, is located with one pole on the fine screen. This is an effective way to keep out magnetic particles that could have the greatest impact on the machine.

It is also very advantageous in this context if a connection is established between a second fine screen and the second pole of the magnet. Any magnetic particles that manage to get through the first fine screen nevertheless are as a result stopped by the second fine screen.

It is also extremely advantageous if the fine screens are configured in such a way that they can be separated from the magnet. The particles that have been caught are particularly easy to remove form the fine screen(s) after they have been separated from the magnet.

In another advantageous development of the invention, a filter is provided that is able to filter particles that can be influenced electrically and/or magnetically out of the flow of air. Electrically charged particles that have a negative effect on the machine can also be kept out of the inside of the housing as a result.

In another advantageous development of the invention, the housing is designed in such a way that effective heat transmission is guaranteed between the housing and the surroundings. This enables the machine to be operated without any danger of overheating even when it is completely enclosed.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

DETAILED DESCRIPTION OF THE INVENTION

Figure 1:
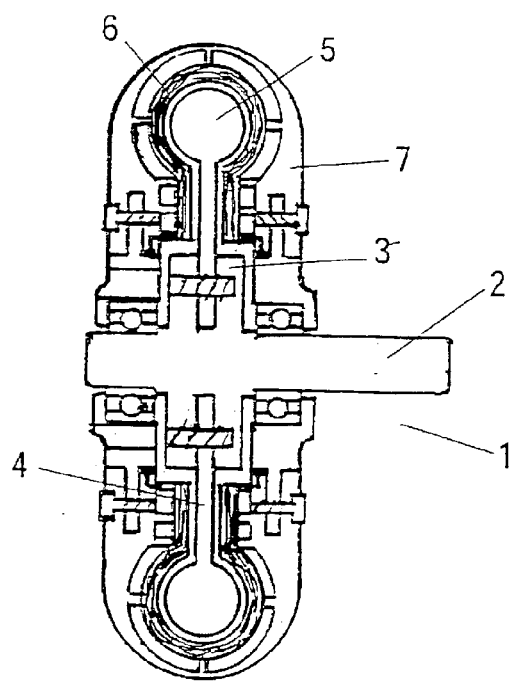
FIG. 1 is a cross-section of a machine with cylindrical magnets and Ω-shaped coils.

In FIG. 1, 1 is a machine that can be used as a motor or as a generator. A rotor 3 to which support elements 4 are attached is located on a shaft 2. Cylindrical permanent magnets 5 are provided on the outer end of these support elements 4. These permanent magnets 5 are surrounded by Ω-shaped coils 6 leaving a small air gap between them. The coils 6 in turn are fixed in stator section 7.

Figure 2:
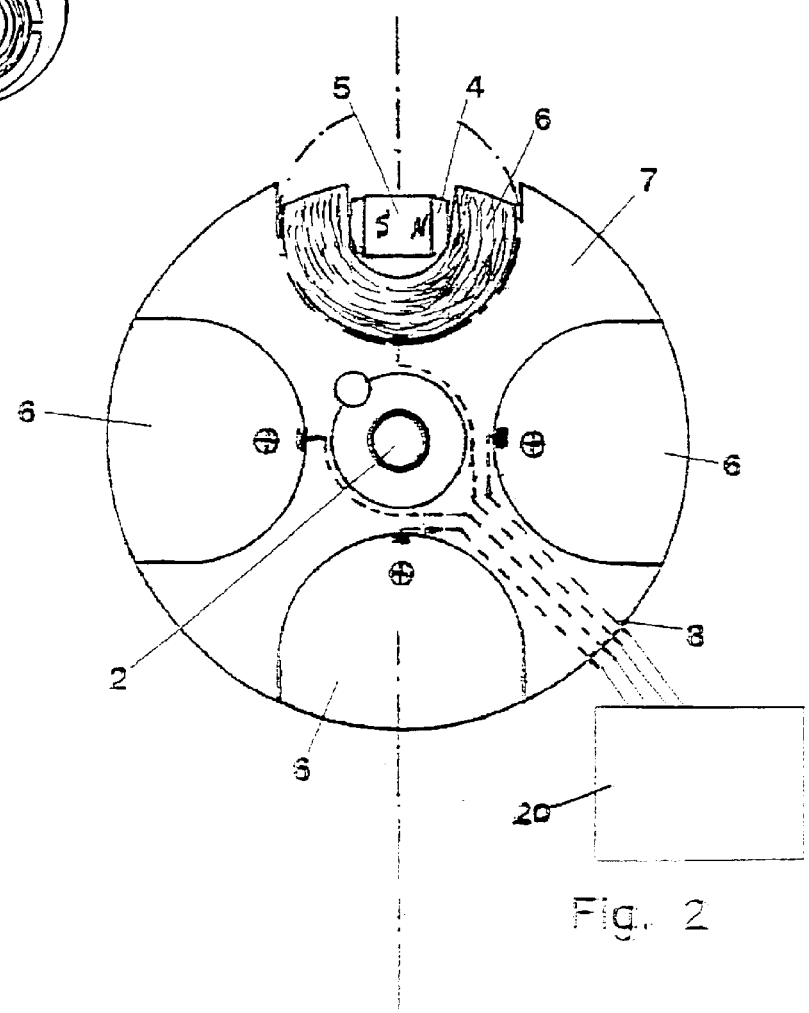
FIG. 2 is a side view of the machine showing the stator.

A side view of the stator 7 is shown in FIG. 2, where four coils 6 are provided. The connection lines 8 for the coils 6 have been wired outwards, so that the coils 6 can be checked without the need for any dismantling if a fault occurs. The electric machine can be operated with direct current voltage before a pole reversal device 20 and with alternating current voltage after pole reversal device 20 when it is used as a motor, while alternating current voltage can on the other hand be tapped before pole reversal device 20 and direct current voltage can be tapped after pole reversal device when the electric machine is used as a generator.

Figure 3:
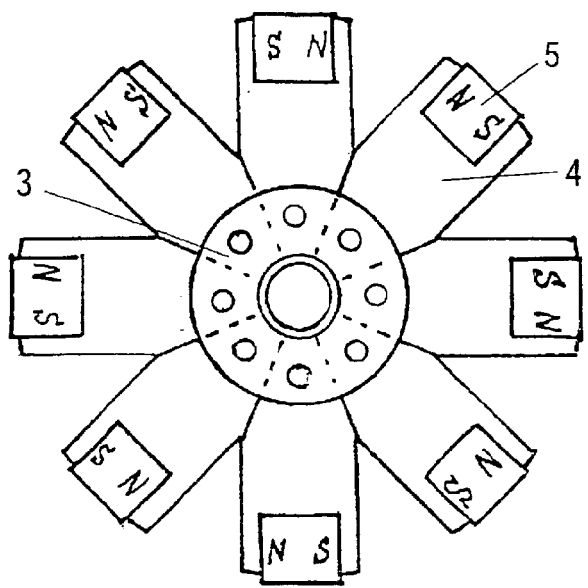
FIG. 3 is a side view of the rotor with permanent magnets that are arranged to permit their removal.
Figure 4:
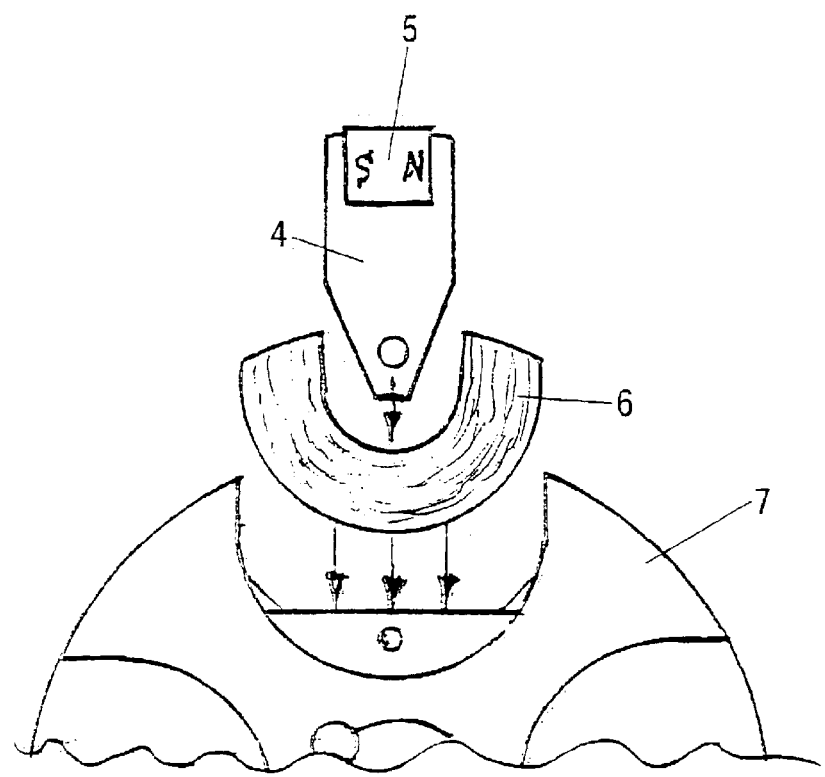
FIG. 4 is a side view of a machine that has been disassembled to some extent.

As is shown in FIG. 3 and 4, not only the permanent magnets 5 together with their support elements 4, but also the coils 6 can be removed easily and can be refitted just as easily. Only the part concerned therefore has to be replaced in each case when repairs are needed.

Figure 5:
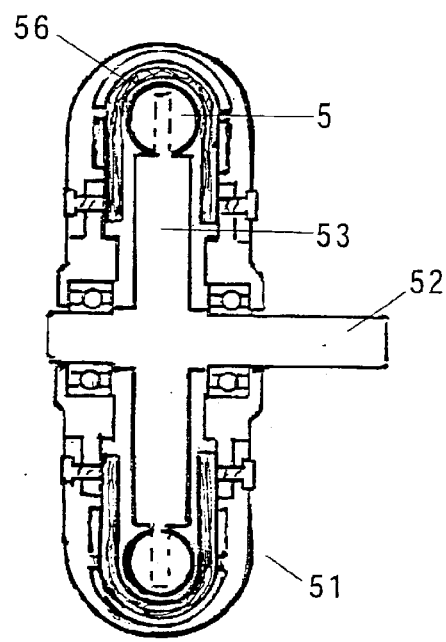
FIG. 5 is a cross section of another machine.
Figure 6:
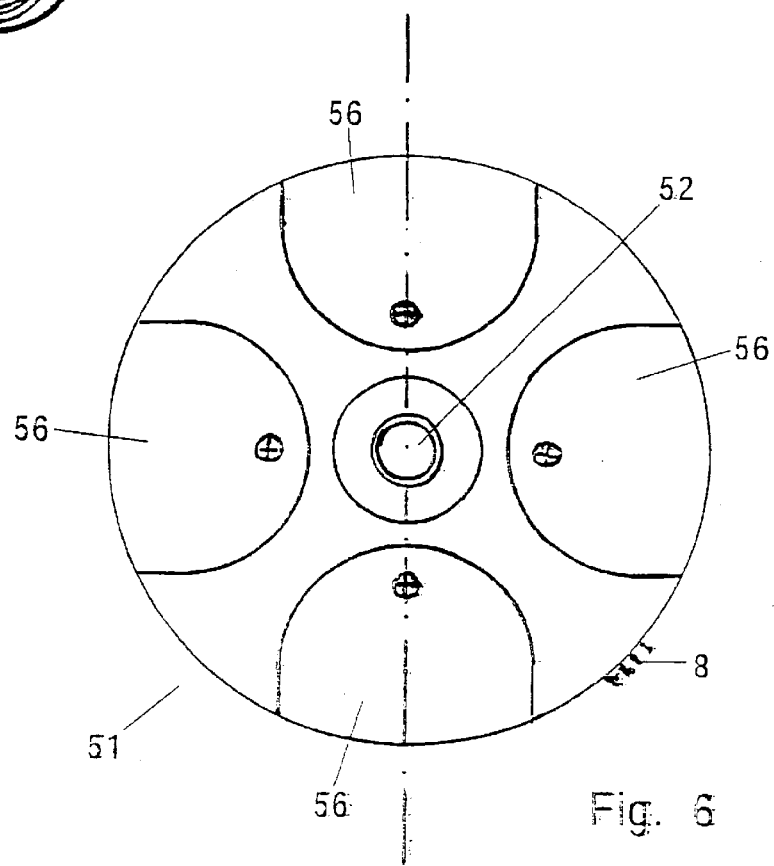
FIG. 6 is a side view of the machine shown in FIG. 5.
Figure 5A:
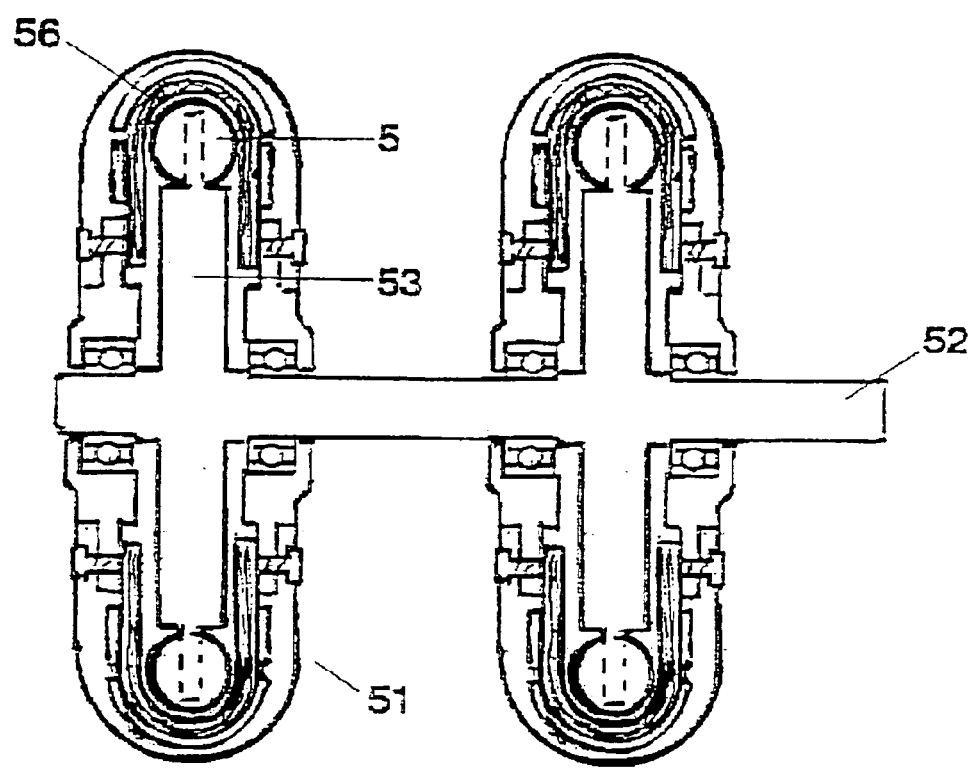
FIG. 5a is a cross-section of a machine having several rotors and coil configurations located one behind the other in the axial direction on a common shaft.

In the embodiment shown in FIG. 5 and 6, the shaft 52 of the machine 51 supports a rotor 53 with a larger diameter, to which permanent magnets 5 are attached directly. Since the permanent magnets are difficult to fit and remove in this configuration, coils 56 have a U-shaped cross-section. When appropriate covers have ben taken off the stator housing, coils 56 can be removed easily. The coil connections 8 are provided on the outside here also so that checks are easy to make.

Figure 7:
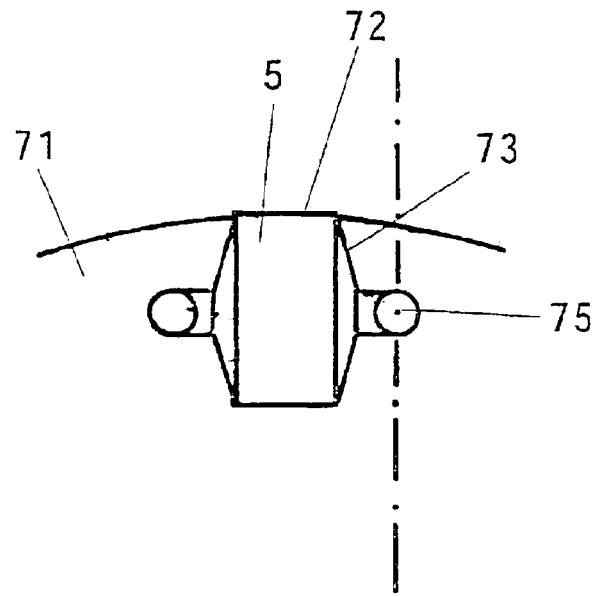
FIG. 7 is a side view of a magnet interlocked with the rotor.
Figure 8:
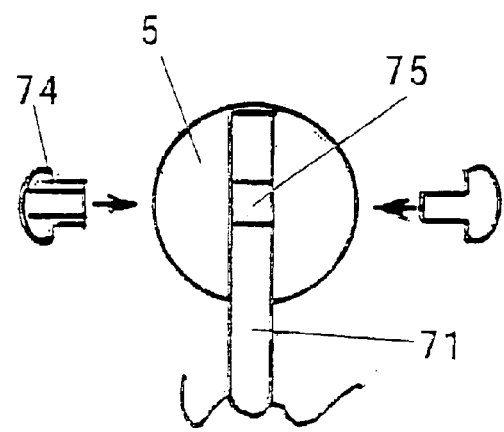
FIG. 8 is a tangential view of the rotor with the same interlocked magnet.

FIG. 7 shows rotor 71 with openings 72, the radial sides 73 of which dovetail outwards. Permanent magnets 5, the shape of which correspond to the shape of openings 72, are fitted in these openings from the axial direction. Permanent magnets 5 are attached in the axial direction by screws 74 that engage holes 75 drilled at the places where openings 72 are widest, as shown in FIG. 8. Permanent magnets 5 are held securely in the radial direction due to the dovetailed interlocking of permanent magnets 5 with rotor 71. The centrifugal forces that are produced in the radial direction during operation and act on permanent magnets 5 are compensated for in this way. It needs to be easy to remove permanent magnets 5 in the axial direction so they are attached only by two screws 74 and as a result permanent magnets 5 are simple to replace.

Figure 9:
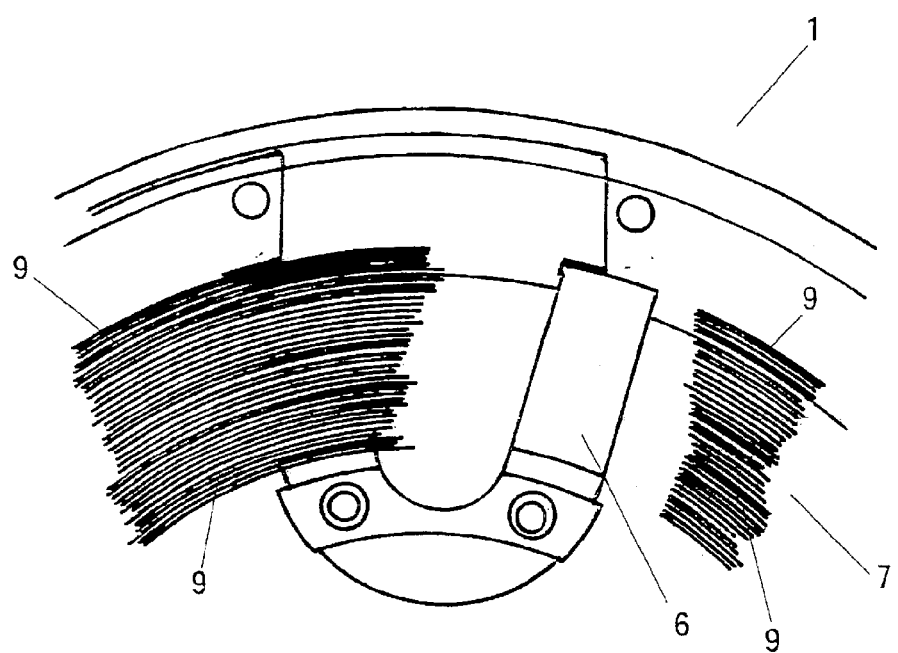
FIG. 9 is a partial side view of a stator that is covered on the outside with concentric rings made of wire.

In order to minimize undesirable effects on the environment due to permanent magnets 5 rotating in machine 1, concentric rings 9 made of insulated wire are provided on the outside of stator 7 and outside coils 6, as is shown in FIG. 9. The alternating magnetic fields of rotating permanent magnets 5 generate current in rings 9 that is converted into heat.

Figure 10:
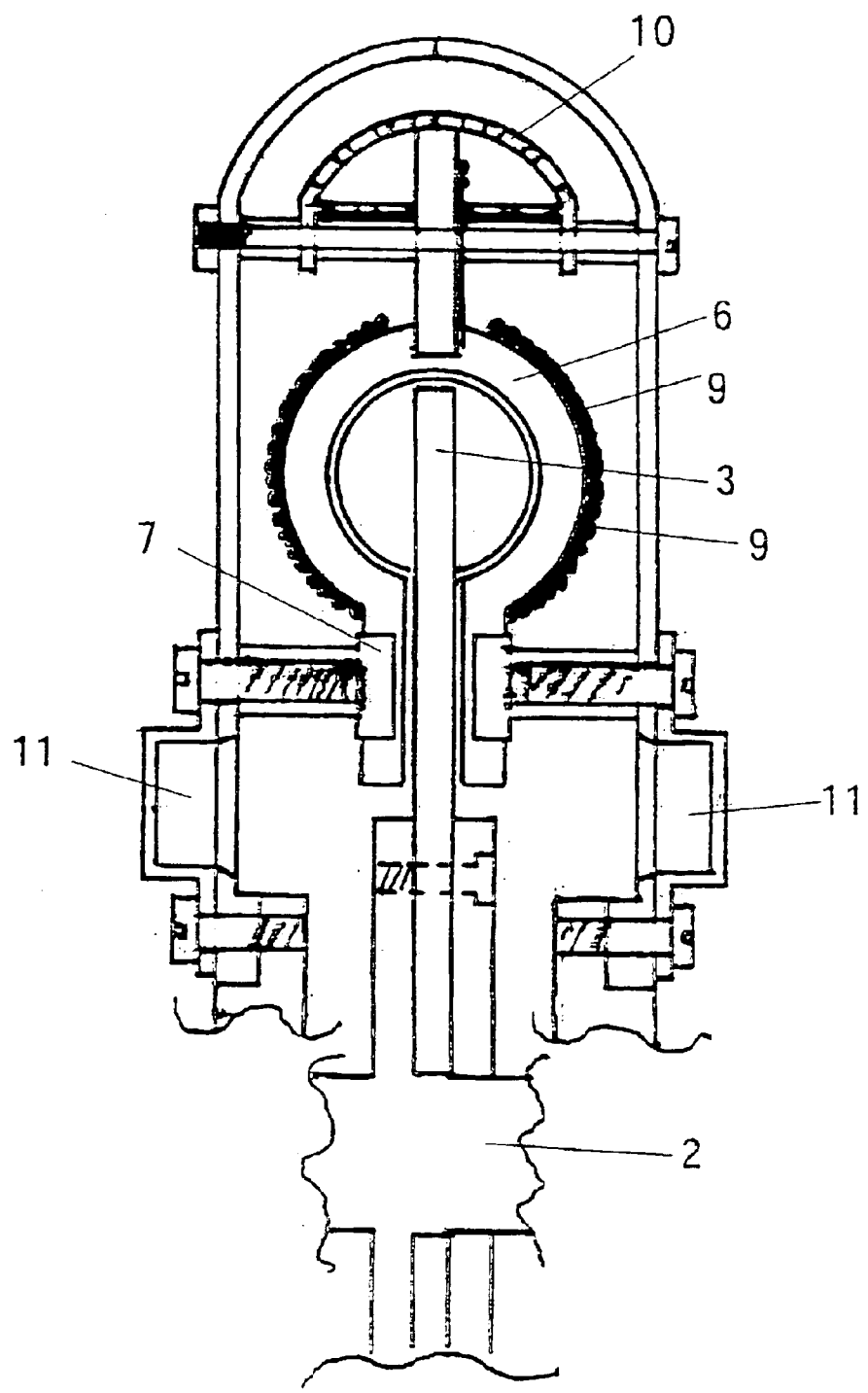
FIG. 10 is a cross-section of another machine which has wire rings as shown in FIG. 9 and a cable support located above the stator.

A cable support 10 that is provided to accommodate connection lines 8 which lead away from coils 6 is located in the radial direction outside stator 7 and rotor 3 in FIG. 10. Air inlet openings 11, though which cooling air is supplied to machine 1, are located close to shaft 2. This cooling air is transported radially outwards by the rotary movement of the rotor and as a result of which the entire machine 1, including coils 6, shielding rings 9 and connection lines 8 are cooled.

Figure 11:
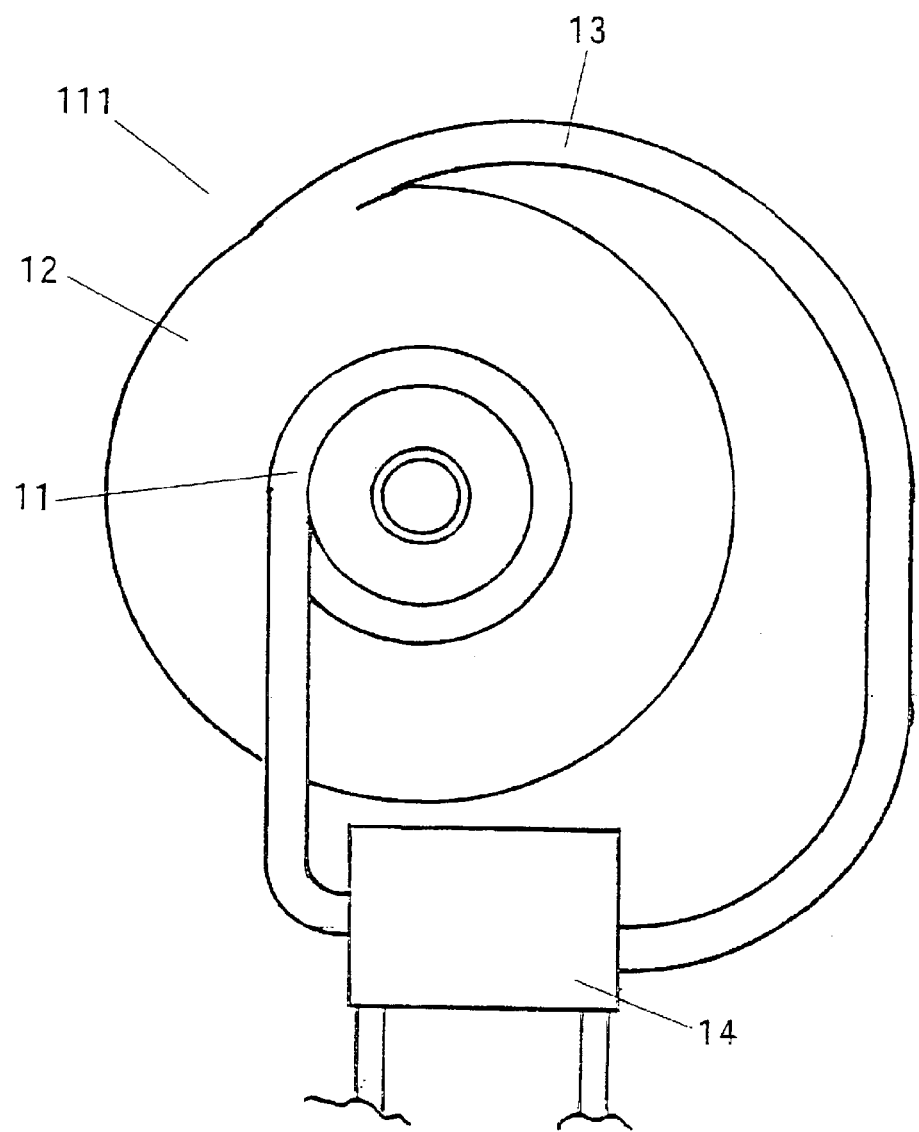
FIG. 11 shows a machine enclosed in a housing with a heat exchanger to remove the waste heat of the machine.
Figure 12:
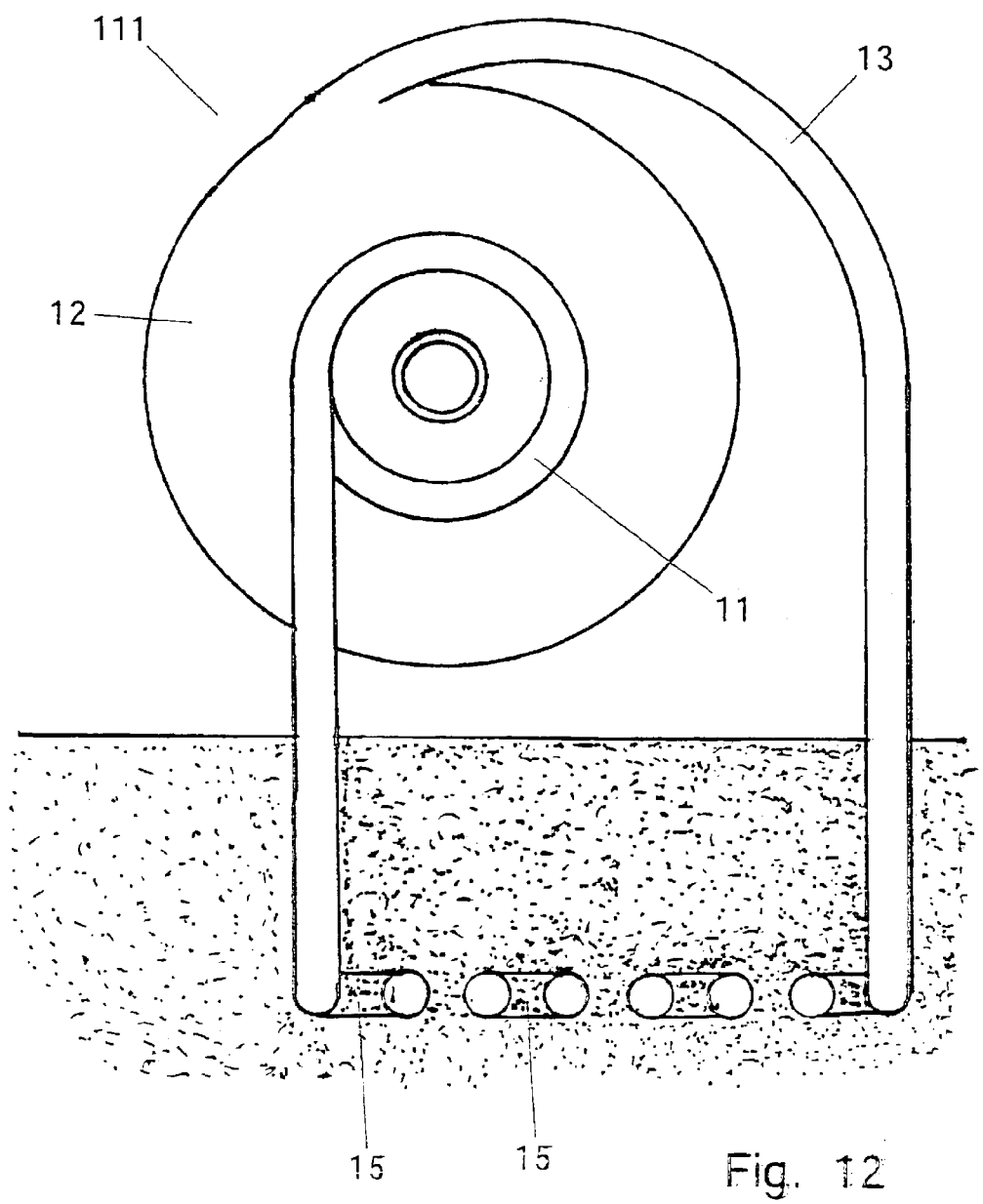
FIG. 12 shows a further machine enclose in a housing with a geothermal heat exchanger to remove the waste heat of the machine.
Figure 13:
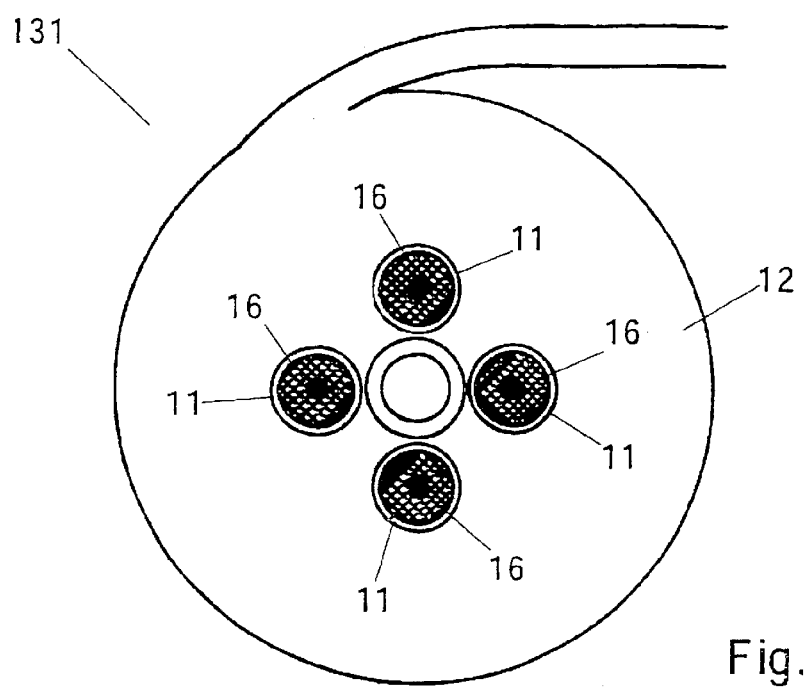
FIG. 13 shows another machine enclosed in a housing with air inlet openings protected by filters with a discharge air duct.
Figure 14:
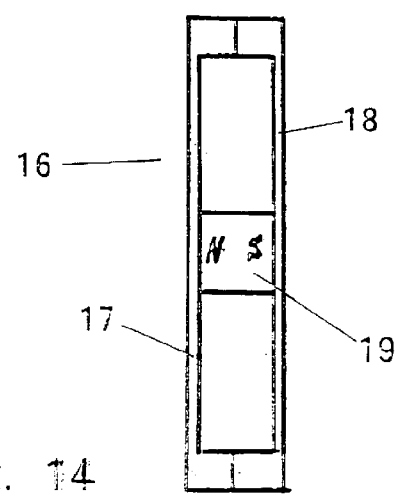
FIG. 14 is a cross-section of a filter assembly with two fine screens and a permanent magnet.

Machine 111 shown in FIG. 11 is completely surrounded by housing 12. A discharge air duct 13, which leads to air inlet opening 11 via heat exchanger 14, is located where housing 12 is radially widest. This means that machine 111 is cooled by a self-contained air circulation system, so that no contaminants can get inside machine housing 12 via the cooling system. This machine 111 can therefore be used even under extreme conditions. The waste heat is removed by heat exchanger 14 via a duct system that is not shown in any detail in the drawing using a gaseous or liquid medium. Another conceivable possibility in this context is to take advantage of the latent heat of a medium in heat exchanger 14. It is also possible to use a geothermal heat exchanger 15 to remove the waste heat of machine 111. The waste heat of machine 111 is then fed into a solid medium such as a cool layer of earth.

Filters 16 that filter out particles which would be harmful to machined 131 are provided on air inlet openings 11 of housing 12 to filter the air supplied to an open cooling air system of another machine 131. Filters 16 consist essentially of two fine metallic screens 17 and 18, each of which is connected to one pole of permanent magnet 19. Magnetic particles that could pass through fine screens 17 and 18 because they are smaller than the mesh in them are magnetically attracted to fine screens 17 and 18. Fine screens 17 and 18 are designed in such a way that they can be separated form permanent magnet 19, as a result of which it is simple to clean off the magnetic particles that have settled on them.

Figure 15:
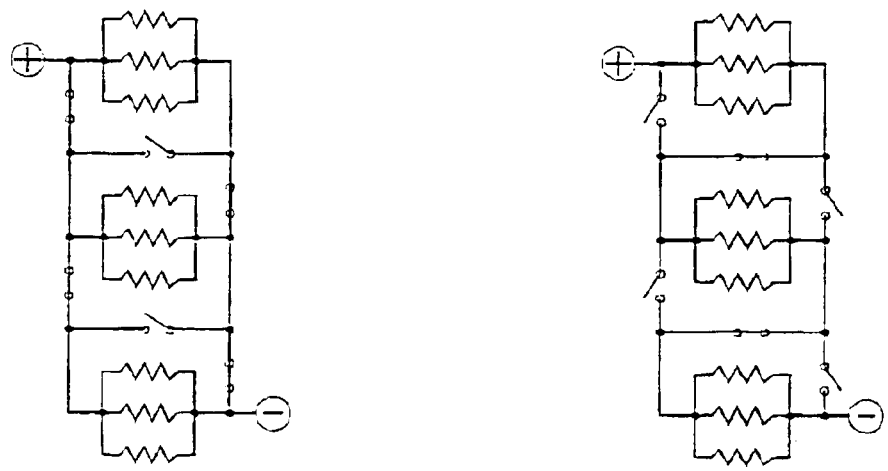
FIG. 15 is a schematic diagram of a circuit for the coils.
Figure 15:

FIG. 15 is a schematic circuit diagram of three coils wherein each coil is composed of three coil layers. The coil layers are switched in parallel with one another and the individual coils can be switched in parallel with each other coil (left side) or in series with each other coil (right side).

Figure 16:
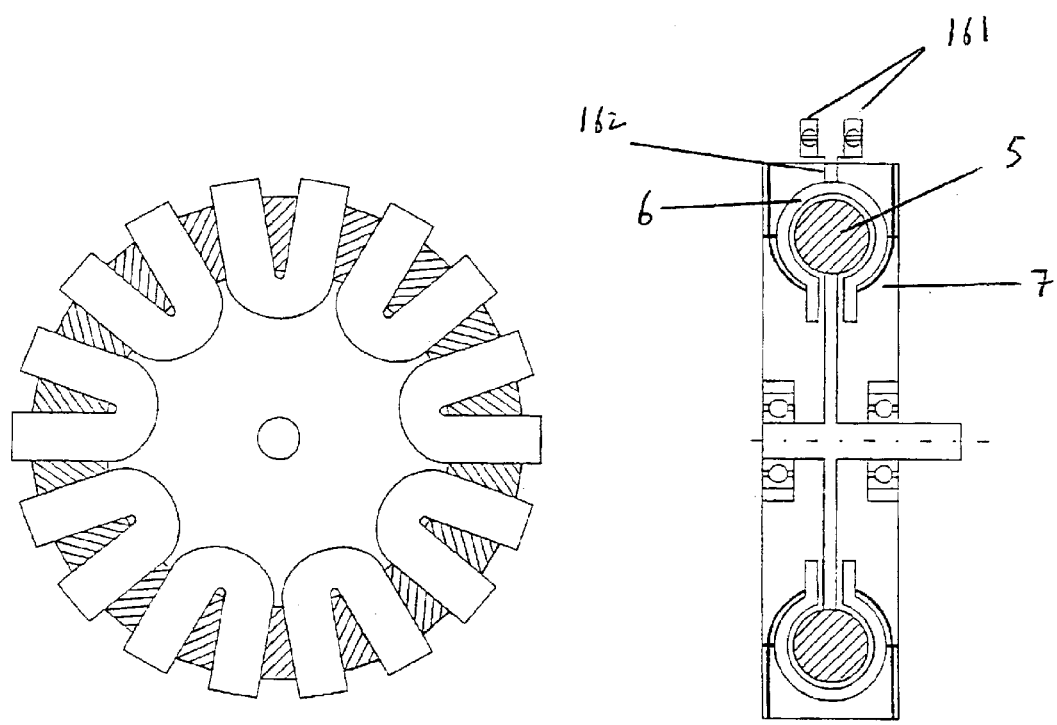
FIG. 16 is a cross-sectional view of an arrangement where the coil lines are passed to the outside to a terminal in the vicinity of the stator.
Figure 17:
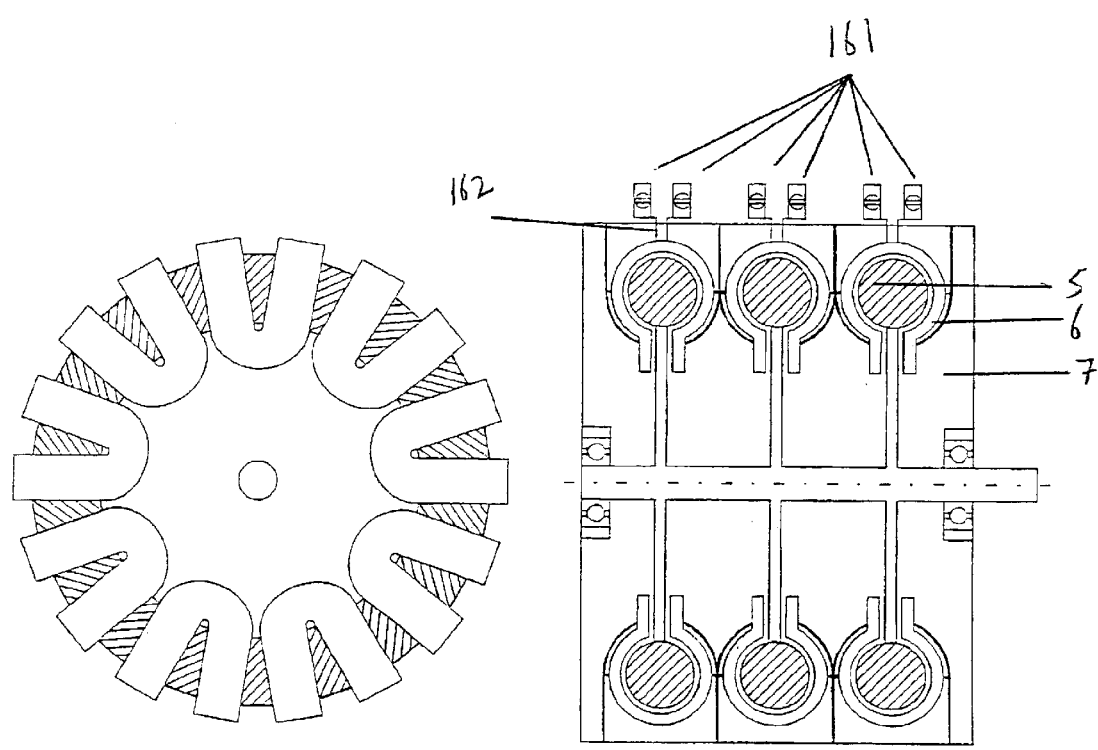
FIG. 17 is a is a cross-sectional view of an arrangement of three rotors where the coil lines are passed to the outside to a terminal in the vicinity of the stators.

In FIG. 16, coil lines 162 form coil 6 are passed to the outside and connected to terminals 161 in the vicinity of stator 7 in an arrangement with one rotor. FIG. 17 shows coil lines 162 from coil 6 passed to the outside and connected to terminals 161 in the vicinity of stator 7 in an arrangement with three rotors.

Figure 18:
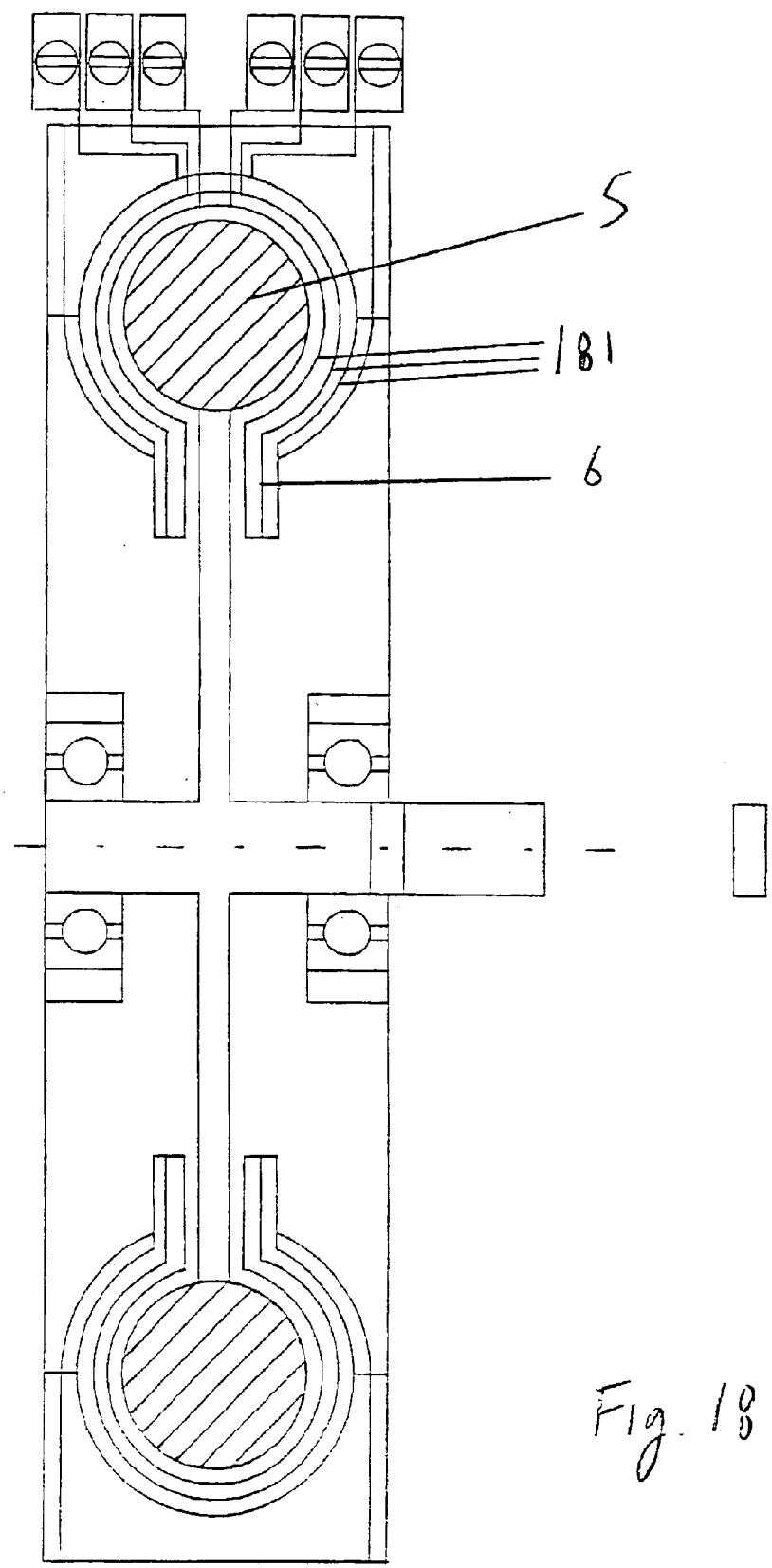
FIG. 18 is a cross-sectional view of an arrangement of coils having several individual layers.
Figure 19:
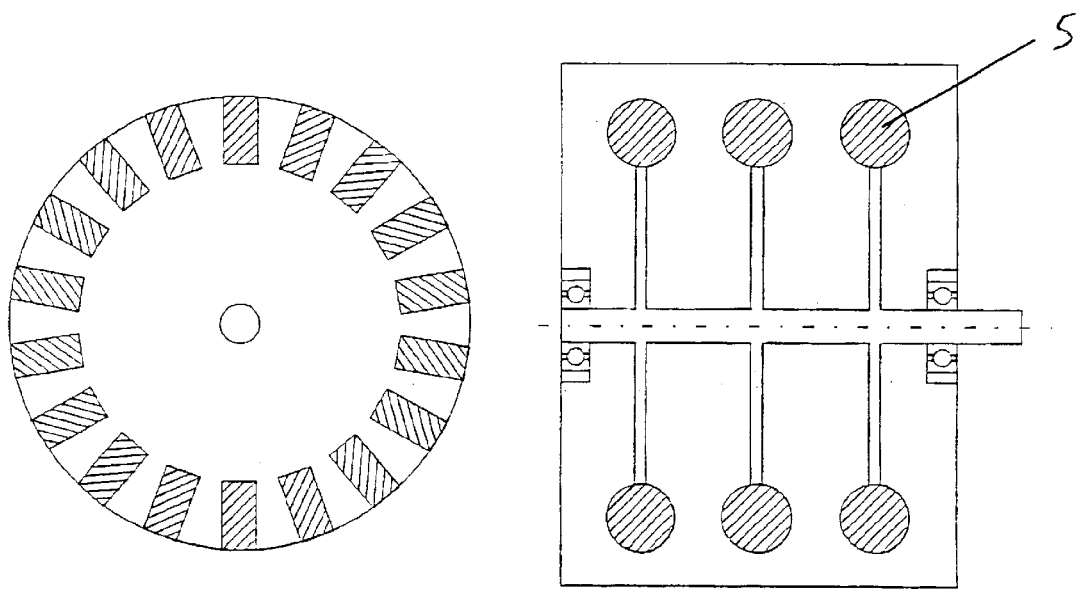
FIG. 19 shows an arrangement having twice as many permanent magnets as coils.

In FIG. 18, coil 6 has a structure comprising several individual coil layers 181. FIG. 19 shows an arrangement having twice as many magnets 5 as coils.

Figure 20:
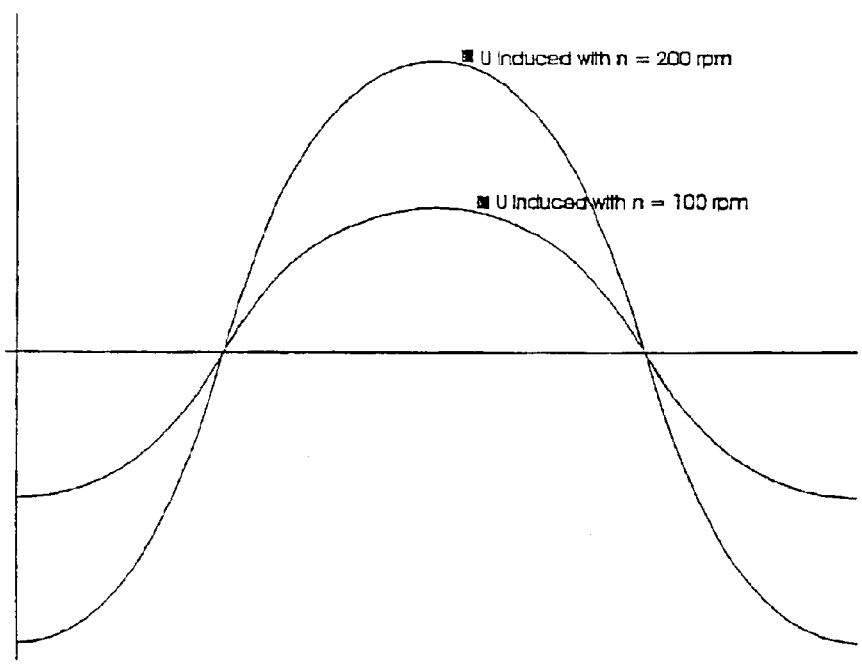
FIG. 20 is a representation of two voltage progressions at different rotor rotation speeds.
Figure 21:
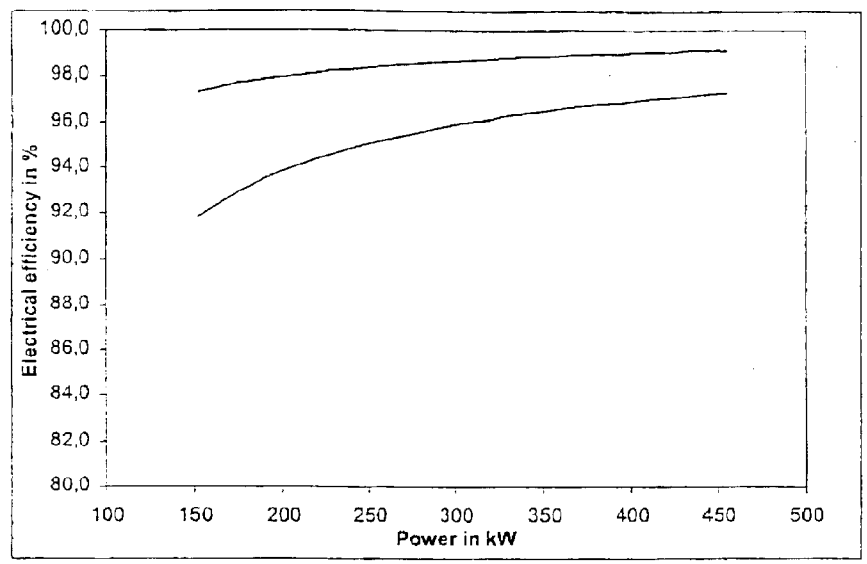
FIG. 21 is a diagram and associated chart showing the effectiveness of an electric machine at various coil temperatures.

FIG. 20 is a representation of voltage progressions at rotor rotation speeds of 100 and 200 revolutions per minute. FIG. 21 is a diagram and associated chart showing the effectiveness of an electric machine according to a embodiment of the invention at coil temperatures of 120° C. and −120° C. As can be seen from FIG. 21, the electrical machine shows a high degree of effectiveness even at low output values, particularly at low (−120° C.) temperatures.

Accordingly, while several embodiments of the present invention has been shown and described, it is obvious that many changes and modifications may be made thereunto without departing from the spirit and scope of the invention.

What is claimed is:

1. An electric machine comprising:
   a rotor;
   a stator;
   cylindrical permanent magnets disposed tangentially on a circumference of said rotor;
   support elements coupling said cylindrical permanent magnets to said rotor;
   an interlocking facility disposed in a radial direction between said support elements of said cylindrical permanent magnets and said rotor;
   electric coils individually fitted on said stator, wherein said electrical coils which do not have an iron core, wherein at least one section of said electric coils extends transversely across said circumference of said rotor and wherein said electric coils are bent so that said electric coils extend on both axial sides of said rotor and surround said cylindrical permanent magnets;
   wherein said electric coils and said cylindrical permanent magnets influence each other when said rotor revolves.

2. The electric machine according to claim 1, wherein said electric coils have a Ω-shaped cross-section and said cylindrical permanent magnets are immediately next to an inside of said electric coils.

3. The electric machine according to claim 1, wherein said support elements are attached to said rotor in such a way that said support elements can be replaced.

4. The electric machine according to claim 1, wherein said cylindrical permanent magnets and said support elements are attached to said rotor so that said cylindrical permanent magnets and said support elements can be removed in an axial direction.

5. The electric machine according to claim 1, further comprising connections for said coils disposed so that they are accessible individually at said stator during assembly, operation and for service purposes.

6. The electric machine according to claim 1, wherein said cylindrical permanent magnets are arranged so that successive cylindrical permanent magnets have different polarities.

7. The electric machine according to claim 1, further comprising a pole reversal device disposed in a supply line to said electric coils.

8. The electric machine according to claim 1, wherein said electric coils are annular and profiles of said rotor and said electrical coils are adapted to each other.

9. The electric machine according to claim 1, wherein several rotors and coil configurations are located behind each other in an axial direction of the electric machine.

10. The electric machine according to claim 1, wherein at least two machines preferably in the form of motors with different diameters are located behind each other on a mutual machine shaft.

11. The electric machine according to claim 1, wherein said electric coils are formed from several coil layers that are only one wire layer thick.

12. The electric machine according to claim 11, wherein a connection for said several coil layers is wired individually and is designed to be connected in series and parallel.

13. The electric machine according to claim 11, wherein said several coil layers are glued together with an adhesive that conducts heat effectively.

14. The electric machine according to claim 1, further comprising a cable support on a circumference of the rotor-stator assembly.

15. The electric machine according to claim 1, wherein said interlocking facility holds said cylindrical permanent magnets securely facility holds direction of said rotor, absorbing centrifugal forces acting in a radial direction of said rotor.

16. The machine according to claim 1, wherein a number of said cylindrical permanent magnets is two times a number of said electric coils.

\* \* \* \* \*

UNITED STATES PATENT AND TRADEMARK OFFICE
CERTIFICATE OF CORRECTION

PATENT NO. : 6,812,609 B2
DATED : November 2, 2004
INVENTOR(S) : Anwander-Cip

It is certified that error appears in the above-identified patent and that said Letters Patent is hereby corrected as shown below:

Column 8,
Line 40, after the word "securely", please delete "facility holds" and insert
-- in an axial --.

Signed and Sealed this

First Day of March, 2005

JON W. DUDAS
*Director of the United States Patent and Trademark Office*